(12) United States Patent  (10) Patent No.: US 9,177,211 B2
Lehning  (45) Date of Patent: Nov. 3, 2015

(54) METHOD AND APPARATUS FOR IDENTIFYING MOTOR VEHICLES FOR MONITORING TRAFFIC

(75) Inventor: Michael Lehning, Hildesheim (DE)

(73) Assignee: JENOPTIK Robot GmbH, Monheim (DE)

( * ) Notice: Subject to any disclaimer, the term of this patent is extended or adjusted under 35 U.S.C. 154(b) by 581 days.

(21) Appl. No.: 13/592,888

(22) Filed: Aug. 23, 2012

(65) Prior Publication Data
US 2013/0050492 A1 Feb. 28, 2013

(30) Foreign Application Priority Data
Aug. 26, 2011 (DE) .......................... 10 2011 053 052

(51) Int. Cl.
*G06K 9/00* (2006.01)
(52) U.S. Cl.
CPC .................................. *G06K 9/00785* (2013.01)
(58) Field of Classification Search
CPC ..... G08G 1/015; G08G 1/017; G08G 1/0175; G08G 1/052; G08G 1/04; G06K 9/00825
USPC ........... 348/148, 149; 340/937, 933; 382/104, 382/105, 176, 182
See application file for complete search history.

(56) References Cited

U.S. PATENT DOCUMENTS

| | | | |
|---|---|---|---|
| 4,817,166 A * | 3/1989 | Gonzalez et al. | 382/105 |
| 5,081,685 A * | 1/1992 | Jones et al. | 382/105 |
| 5,651,075 A * | 7/1997 | Frazier et al. | 382/105 |
| 6,240,217 B1 | 5/2001 | Ercan et al. | |
| 6,281,928 B1 * | 8/2001 | Umezaki et al. | 348/148 |
| 6,339,651 B1 * | 1/2002 | Tian et al. | 382/105 |
| 6,373,962 B1 * | 4/2002 | Kanade et al. | 382/105 |
| 6,473,517 B1 * | 10/2002 | Tyan et al. | 382/105 |

(Continued)

FOREIGN PATENT DOCUMENTS

| | | |
|---|---|---|
| CN | 201435152 Y | 3/2010 |
| EP | 2 320 384 A1 | 5/2001 |

(Continued)

OTHER PUBLICATIONS

Liu, Chen-Chung, et al., "Multiple vehicle license plates localization and extraction of vehicle license plate number for moving vehicles", IJAIT, Dec. 2010, 4(2):136-151.

(Continued)

*Primary Examiner* — Victor Kostak
(74) *Attorney, Agent, or Firm* — Duane Morris LLP

(57) ABSTRACT

A method and an apparatus for identifying motor vehicles for monitoring traffic. The identification is carried out by image-evaluation and includes determining the size ratios of a license-plate contour in a perspectively distorted image on the basis of stored standardized license-plate formats, determining the size of the perspective distortion of the license-plate contour on the basis of the associated standardized license-plate format, establishing a calculation rule for the perspective rectification on the basis of the ascertained distortion of the license-plate contour with respect to the associated license-plate format, rectifying the extracted license-plate-containing motor-vehicle view, and comparing the rectified image with reference images of front views of motor vehicles stored in a database in order to assign the image with greatest correspondence to a group of classified motor vehicles.

16 Claims, 6 Drawing Sheets

(56) References Cited

U.S. PATENT DOCUMENTS

| | | |
|---|---|---|
| 7,970,644 B2 * | 6/2011 | Hedley et al. ............... 705/13 |
| 8,391,560 B2 * | 3/2013 | Tsai et al. ................. 382/105 |
| 2006/0056658 A1 * | 3/2006 | Kavner ..................... 382/105 |
| 2006/0200307 A1 | 9/2006 | Riess |
| 2008/0166023 A1 | 7/2008 | Wang |
| 2009/0290757 A1 | 11/2009 | Mirn et al. |
| 2011/0013022 A1 * | 1/2011 | Allen et al. ............... 348/149 |
| 2012/0069183 A1 * | 3/2012 | Aoki et al. ................ 348/148 |

FOREIGN PATENT DOCUMENTS

| | | |
|---|---|---|
| EP | 1 997 090 B1 | 9/2010 |
| EP | 2 306 429 A1 | 4/2011 |
| KR | 100837244 | 6/2008 |
| KR | 1020080111317 | 12/2008 |

OTHER PUBLICATIONS

Fernandez-Caballero, A., et al., "Road-traffic monitoring by knowledge-driven static and dynamic image analysis", Science Direct, Expert Systems w/Applications 35(2008), 701-719.

dos Santos, D.J.A., "Automatic Vehicle Recognition System", Instituto Superior Technico—Universidade Tecnica de Lisboa Dissertation, Sep. 2008, 1-87.

* cited by examiner

METHOD AND APPARATUS FOR IDENTIFYING MOTOR VEHICLES FOR MONITORING TRAFFIC

FIELD OF THE INVENTION

The invention relates to a method and an apparatus for identifying motor vehicles for monitoring traffic.

BACKGROUND OF THE INVENTION

For capturing or identifying motor vehicles in flowing traffic, numerous methods are known. In addition, there exists a broad spectrum of sensor options, with which motor vehicles can be recognized on the basis of various features. A broad field in this respect is here the identification using external features. In a special form, such features are ascertained from motor-vehicle contours. These are obtained from profile recordings of light barrier systems or from images from video or photo systems placed above the road. It is thus possible by evaluating features of the vehicle front or of other suitable views of motor vehicles to distinguish between vehicles.

Frequently, image-based identification systems are also combined with license plate recognition, in which the registration number of the motor vehicle is ascertained from an image of the front or rear view using optical character recognition (OCR). Systems which exclusively operate with license plate recognition are also used. The ascertainment of the registration number, however, can under certain circumstances be subject to errors which are caused, for example, by the incorrect recognition of individual characters of very similar registration numbers. For this reason, the use of additional systems with which motor vehicles can be identified using further features is sensible. Such a system can be based, for example, on contour recognition, in which the match between a currently produced image and an already existing image of a motor vehicle is checked, and identification occurs on the basis of the greatest similarity.

In patent specification EP 1 997 090 B1, a camera positioned next to the road is used to ascertain the three-dimensional shape of a moving vehicle from a plurality of subsequent recordings. Using the ascertained shape, the vehicle type is then identified by way of a comparison with shapes from an already established database. A disadvantage here is that a plurality of recordings are necessary to ascertain the vehicle type, and that the recordings must be taken in correspondence with the position in which the comparison images in the database were produced.

A further variant of the capture and the identification of features of a vehicle is disclosed in EP 2 320 384 A1. Here, one or more characteristic features of the vehicle are ascertained, likewise in the image of a vehicle recorded by a camera. These characteristic features are captured using methods, which are not described in more detail, for image processing in order to ascertain light/dark regions or to calculate contrast, brightness or color value digit sums. Using these features, an already existing, categorized reference image from a database is then ascertained by similarity evaluation. With sufficient correspondence, the recorded vehicle is categorized in accordance with the classified reference image. However, it is conceded that inaccuracies in the sensor technology under different illumination conditions can lead to errors in the evaluation using a single recording, and it is therefore sensible to carry out the assessment using a plurality of images or with the additional use of further sensors. It must therefore be assumed that the capture of the selected characteristic features is significantly dependent on weather influences, light influences and deviating angle ratios of the image recording, and thus a combination of a plurality of image sensors is always necessary to uniquely identify a vehicle.

SUMMARY OF THE INVENTION

It is an object of the invention to find a possibility which permits capture of features suitable for identifying a motor vehicle with the least material-related complexity (number of cameras and evaluation complexity). It is an extended object to configure the motor-vehicle identification independently of an exact alignment of the camera configuration.

This object is achieved by a method for identifying motor vehicles for monitoring traffic, having the following steps:
 a) recording a perspective image of a motor vehicle under an acute angle with respect to the road, wherein the image contains at least a view of a motor vehicle that has a license plate,
 b) recognizing the license plate in the recorded image and capturing a license-plate contour,
 c) ascertaining the format of the license-plate contour from the comparison of the corner points of the license-plate contour with stored standardized license-plate formats,
 d) ascertaining a calculation rule for perspective rectification of the license-plate contour on the basis of the associated standardized license-plate format,
 e) producing an image region which surrounds the license-plate contour and is perspectively distorted in a matching manner, with a prespecified magnification in dependence on the ascertained format of the license-plate contour,
 f) extracting the content of the distorted surrounding image region and discarding the remaining image of the motor vehicle,
 g) adapting a license-plate-containing motor-vehicle view, which is extracted from the distorted surrounding image region, to the format of reference images stored in a database,
 h) rectifying the motor-vehicle view using the calculation rule ascertained from the license-plate contour,
 i) similarity comparison of the captured contours and their position with those of reference images from the database, and recognizing the greatest correspondence of the captured contours with one of the reference images,
 j) categorizing the recorded motor vehicle into a motor-vehicle class, with which the reference image with the greatest correspondence was associated, and outputting the motor-vehicle class.

Identification here means categorizing the captured motor vehicles in previously defined, typical motor-vehicle classes. Identification for example using motor-vehicle types is not content of the preferred embodiment of the method, but is possible in principle by inserting complementary method steps.

In the production of the image region in method step e), its size ratio and position with respect to the license-plate contour are advantageously derived from the ascertained standardized license-plate format.

In one embodiment according to the invention, after extracting the distorted surrounding image region, characteristic features in the form of contours within the extracted motor-vehicle view are captured.

In one expedient embodiment, a correlation method is used in method step j) for the similarity comparison of the captured contours with the reference images.

In one variant of the method, in method step j), the positions, distances and size ratios of the contours with respect to the license-plate contour are compared for the similarity comparison of the captured contours with the stored reference images.

In one special configuration, the image recording in method step a) takes place under a lateral angle with respect to the road in a perspective view of the motor vehicle.

In one further configuration, the image recording in method step a) takes place under an elevation angle with respect to the road in a perspective view of the motor vehicle.

In one advantageous variant, the angle between the road and the image-capture device is selected to be at most so great that the license-plate-containing motor-vehicle view still has a sufficiently large area of the license-plate contour to allow a unique association of the standardized license-plate formats and thus achieves an independence of the perspective rectification from the exact knowledge of the angles of the image recording with respect to the road of the motor vehicle.

Expediently, the captured contours used are outlines from the group of constructive elements such as headlights, ventilation-air inlets, bumpers, body covers, hoods, panels and edges.

In a further advantageous variant, in addition to the license-plate contour, the position and size of the lettering of the license plate are captured for the ascertainment of the standardized license-plate format.

In a special embodiment, in addition to the license-plate contour, the registration number of the recorded license plate is captured, subjected to an OCR method and stored for the prosecution of a traffic violation.

In a further embodiment, in addition to the image recording, still further measurement data in connection with a traffic violation, date and time are simultaneously captured and stored with reference to the recorded image of the motor vehicle by saving this data in a script line directly in the image or in a data container within the image file.

Furthermore, the object according to the invention is achieved with an apparatus for identifying motor vehicles for monitoring traffic, having an image-capture device, an image-evaluation unit with memory, an image comparison unit, a database with reference images and an output unit, wherein the image-capture device is aligned for recording an image of the motor vehicle with at least one motor-vehicle view, which contains a license plate, the image-evaluation unit contains means for recognizing the license plate, means for separating the image background and extracting a relevant motor-vehicle view from the recorded image and means for capturing characteristic features within the extracted motor-vehicle view, the image comparison unit has means for the similarity comparison of the characteristic features of the extracted motor-vehicle view with those of reference images from the database, means for recognizing the greatest correspondence of the captured motor-vehicle view with one of the reference images and means for associating the ascertained reference image with the greatest correspondence to a motor-vehicle class, in that the image-evaluation unit furthermore contains means for determining the size ratios of a license-plate contour in the perspectively distorted image on the basis of stored standardized license-plate formats, means for determining the size of the perspective distortion of the license-plate contour on the basis of the associated standardized license-plate format, means for establishing a calculation rule for the perspective rectification on the basis of the ascertained distortion of the license-plate contour with respect to the associated license-plate format, and means for rectifying the extracted license-plate-containing motor-vehicle view, wherein the calculation rule for rectification of the license-plate contour is intended for the rectification of the entire extracted license-plate-containing motor-vehicle view such that the perspective rectification is achieved from the exact knowledge of the angle of the image recording with respect to the road of the motor vehicle.

In one advantageous embodiment, the image-evaluation unit has means for producing an image region, which surrounds the license-plate contour and is perspectively distorted in a matching manner, preferably a perspectively distorted rectangle, for extracting the license-plate-containing motor-vehicle view to be evaluated from the recorded image, wherein the means for producing the image region contain an adjustment of the size of the image region with respect to the license-plate contour in dependence on the standardized license-plate format associated with the license-plate contour.

In one further variant, the image-evaluation unit has means for determining characteristic features in the form of contours within the produced image region, wherein the result from the means for determining the contours is supplied to the means for rectification of the extracted license-plate-containing motor-vehicle view.

In a special embodiment, the database has typical reference images for defined motor-vehicle classifications according to class categories of one of the groups of vehicle manufacturer, vehicle sorts and vehicle types.

In a particularly advantageous variant, the apparatus additionally has a measurement system for determining the speed of the motor vehicle and means for recognizing the registration number within the license-plate contour.

BRIEF DESCRIPTION OF THE DRAWINGS

The invention will be explained in further detail below with reference to exemplary embodiments. In the associated drawings.

DESCRIPTION OF THE INVENTION

Figure 1:
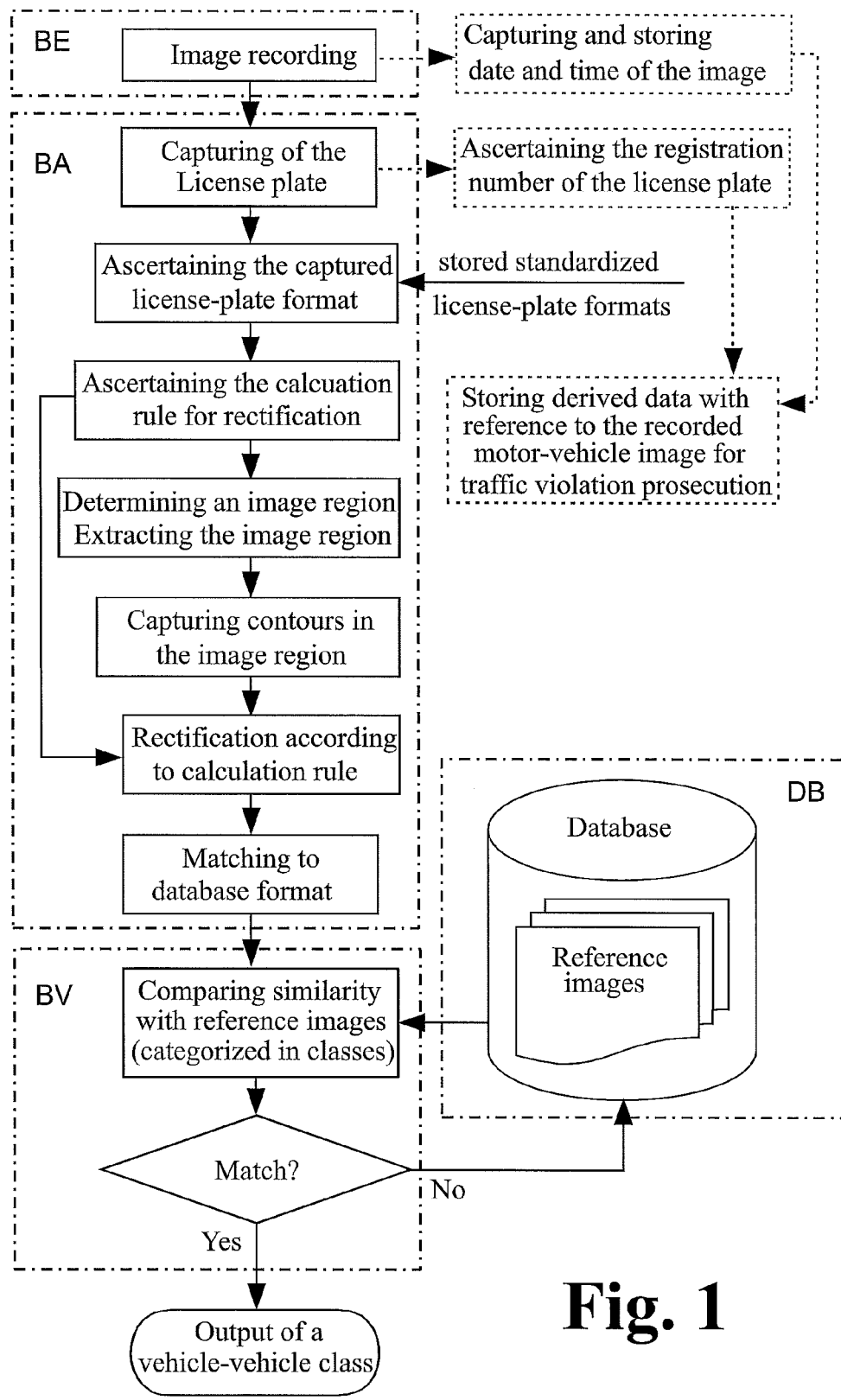
FIG. 1 shows a flow chart of the method according to the invention for monitoring traffic.

The sequence of the method occurs according to the method sequence shown schematically in FIG. 1.

In a first step, an image-capture device BE is used to record a perspective image under an acute angle with respect to the road. This image can be a digital individual recording or an individual image from a video recording. An image 20, recorded with the image-capture device BE, of the motor vehicle 13 can be recorded in principle from any conceivable perspective, as long as at least one motor-vehicle view 14 of the motor vehicle 13 with a license plate 15 is captured. In order to simplify the designation, the term "front view 14" is used below, but without restricting the general statement that also the rear view of a motor vehicle 13 can be captured.

In a second step, the license plate 15 is recognized and a license-plate contour in the front view 14 corresponding to the license-plate outline is produced in the image-evaluation unit BA. In a third step, the standardized format of the license plate 15 is ascertained on the basis of a comparison of the corner points of the license-plate contour 21 and the corner points of the license-plate formats stored in the memory 7 of the image-evaluation unit BA. In the subsequent step, a calculation rule for the perspective rectification can be established from the difference between the recorded, perspectively distorted license-plate format and the stored, non-distorted license-plate formats.

In the subsequent step, with respect to the ascertained license-plate contour 21, a rectangle, which surrounds the license-plate contour 21 and is enlarged to a prespecified size, is produced. The image content within the rectangle is extracted and the image content outside the rectangle is discarded. In the subsequent step, contours, located in the front view 14, of the recorded motor vehicle 13 are ascertained within the extracted image content, and said contours are transformed as characteristic features of the motor vehicle 13 into a contour image. In the subsequent step, the front view 14, which is reduced to contours 24, is perspectively rectified using the calculation rule established from the license-plate contour 21 and scaled, in a further step, to the standardized database format of the reference images 30. In the subsequent step, a similarity comparison of the captured contours 24 and their position with those of reference images 30 from the database DB and ascertainment of the greatest correspondence to one of the reference images 30 of the database DB are then carried out in an image comparison unit BV. In the last step, the captured motor vehicle 13 is identified on the basis of the extracted reference image 30 with the greatest correspondence and on the basis of the categorization of all reference images 30 in different motor-vehicle classes (for example reference-image classes 31-34) and the relevant motor-vehicle class is output.

Figure 2:
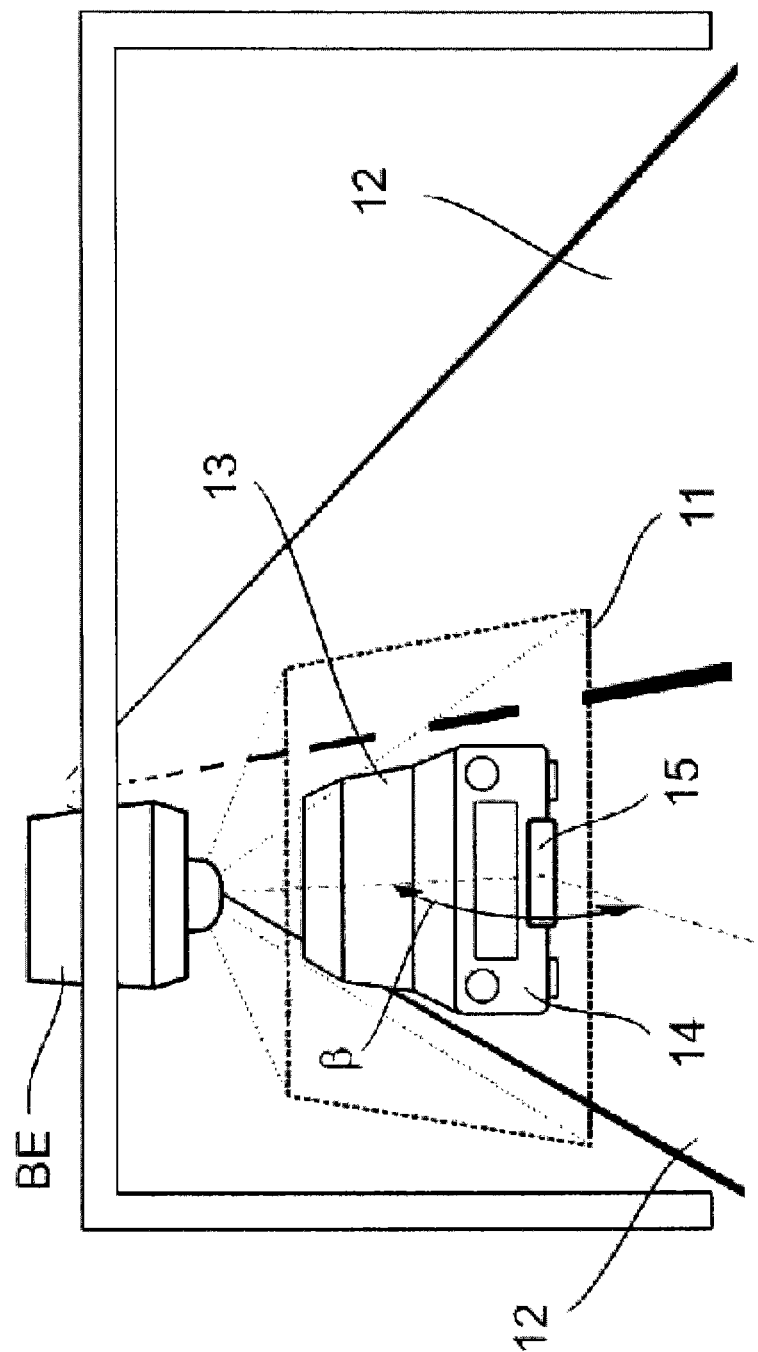
FIG. 2 shows an arrangement for the use according to the invention of the method and of the apparatus above the road.

The method and the apparatus can be used with the arrangement illustrated in FIG. 2. To this end, the image-capture device BE in the form of a camera 1 is arranged, in the apparatus for recording a motor vehicle 13, above the road 12 under an elevation angle $\beta$ with respect to the road. The image region 11 of the camera 1 is aimed here at the motor vehicle 13 moving toward said camera such that a perspective view with the front view 14 and the license plate 15 is captured in an image 20. The elevation angle $\beta$ here ranges from $0°<\beta<90°$. A range between 20° and 45° proves particularly advantageous.

Figure 3:
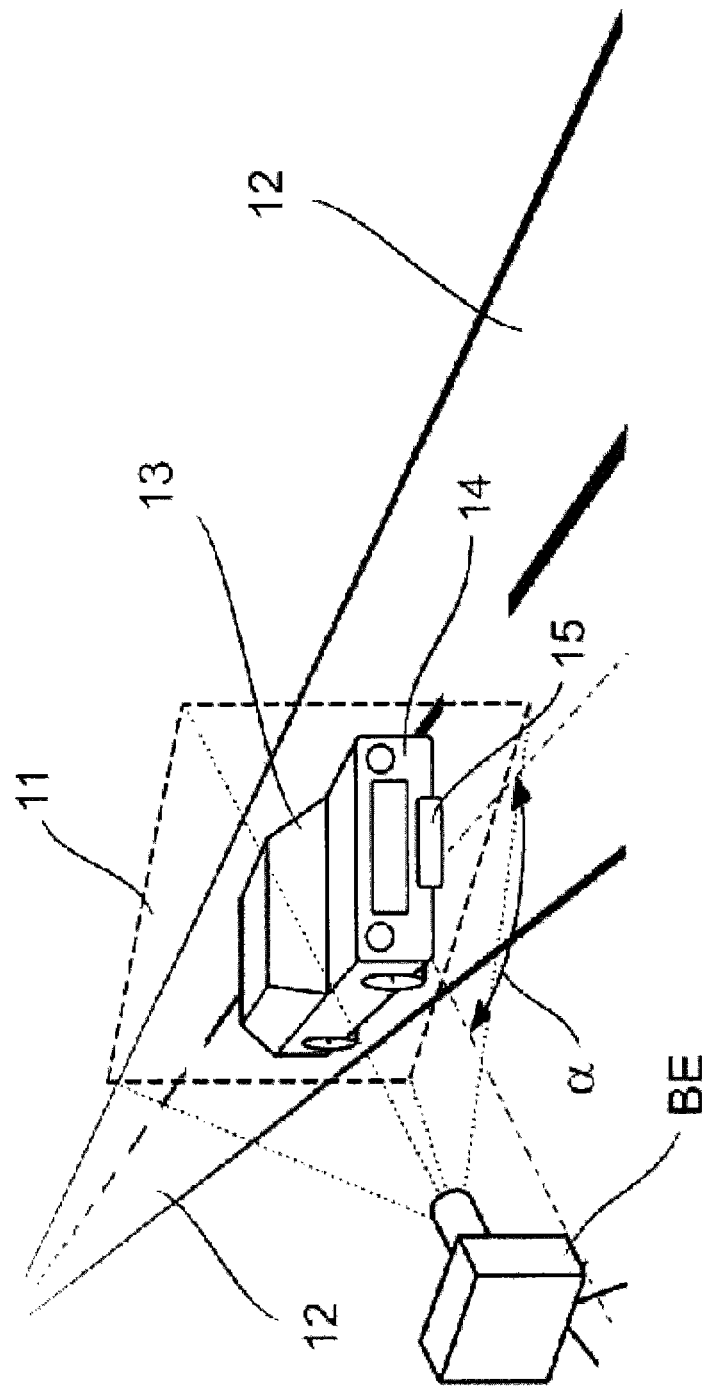
FIG. 3 shows an arrangement for the use according to the invention of the method and of the apparatus laterally with respect to the road.

A further embodiment of the method is illustrated in FIG. 3. The image-capture device BE is arranged at an angle $\alpha$ laterally with respect to the road 12 of the motor vehicle 13. The image region 11 of the image-capture device BE is aimed here at the motor vehicle 13 moving toward said device such that a perspective image of the front view 14 with the license plate 15 and a side view is captured in the recorded image 20. The same range specifications as above for the elevation angle $\beta$ apply to the lateral angle $\alpha$.

In a non-illustrated variant of the method, the image-capture device BE can also be arranged in a lateral position having an angle $\alpha$ with respect to the road 12 and in a position which is elevated at an angle $\alpha$ with respect to the road 12. In this combination, one of the two angles can then also have the value 0 in order to arrive at the special cases in FIG. 2 and FIG. 3.

Figure 4:
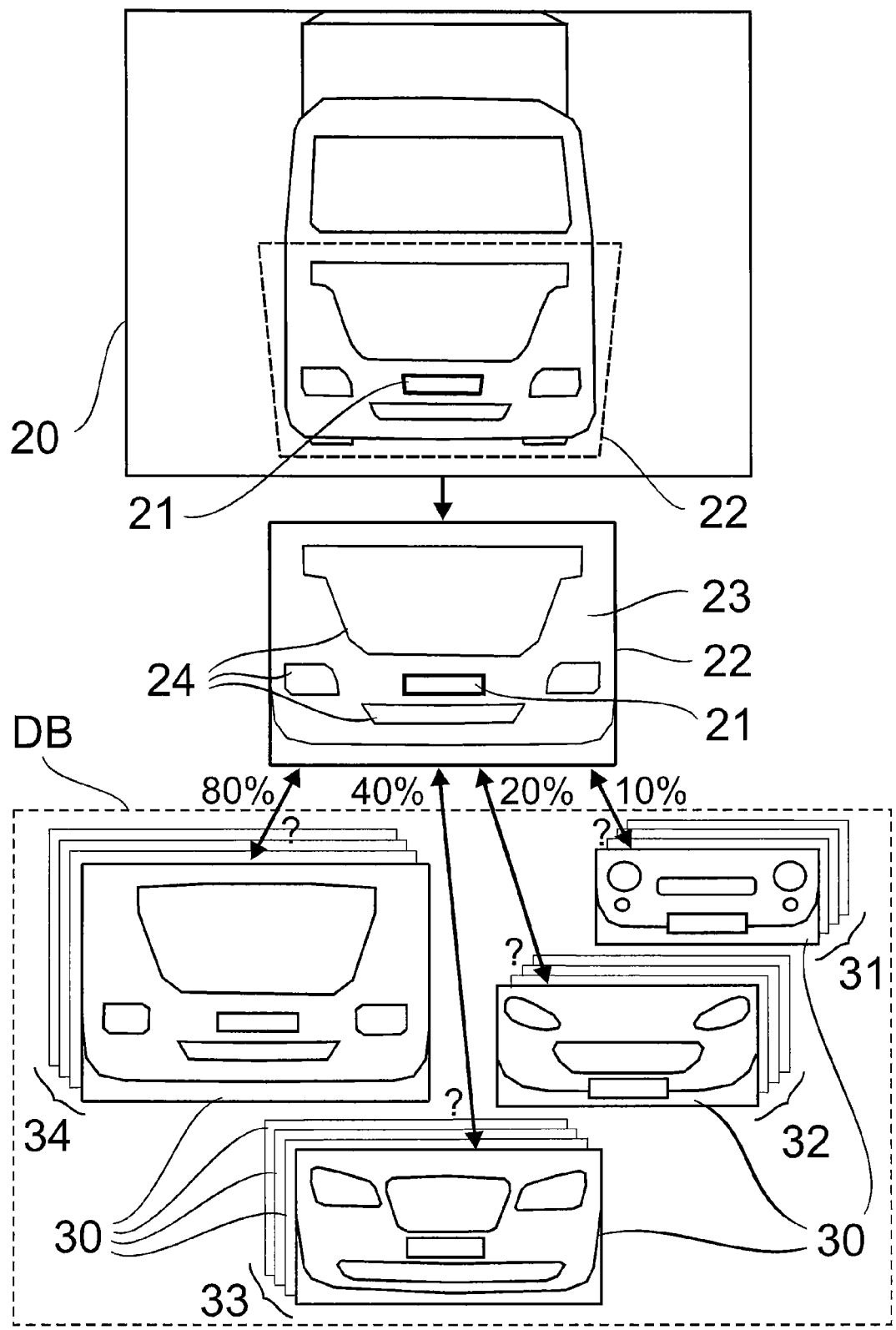
FIG. 4 shows an example of an identification of a motor vehicle using the method according to the invention and the apparatus from a perspective view from above.
Figure 5:
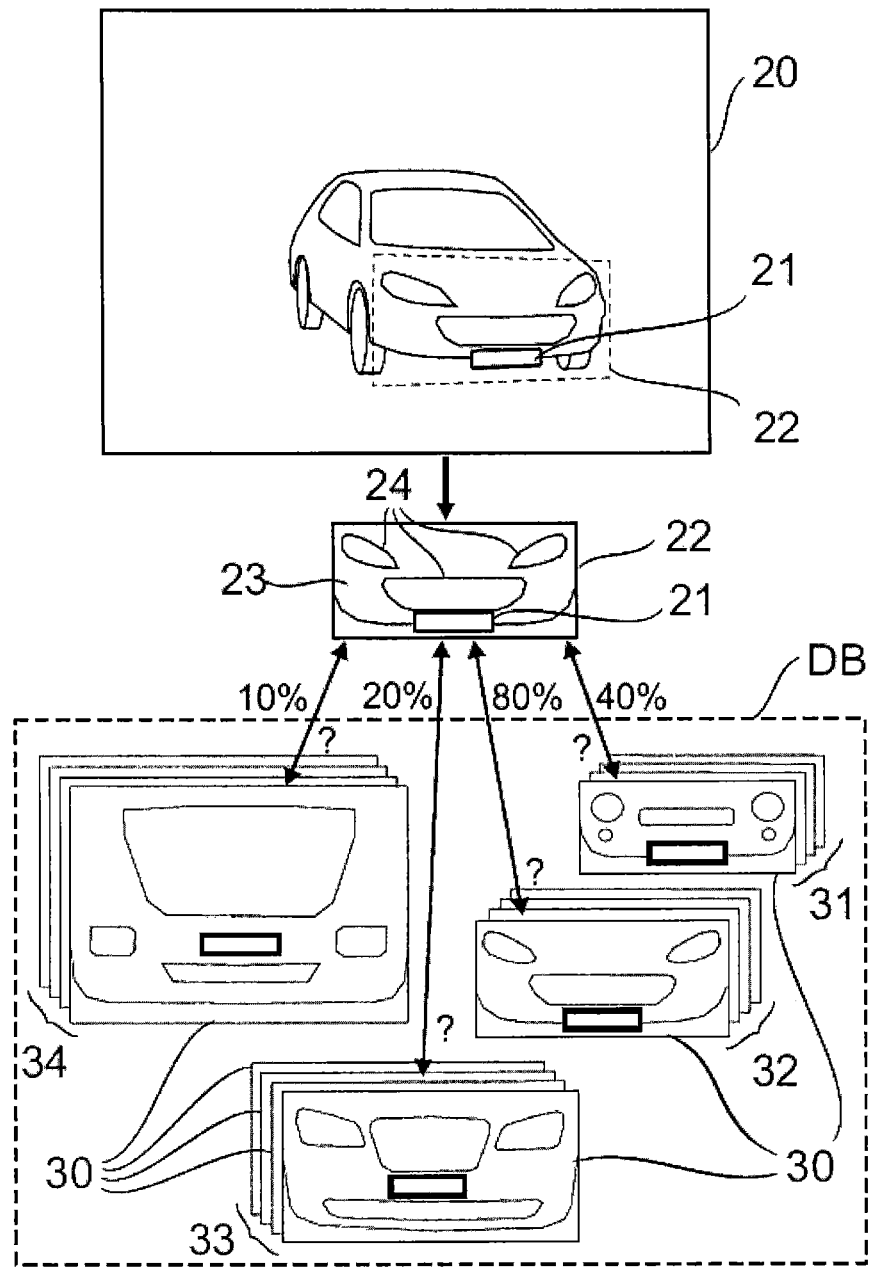
FIG. 5 shows an example of an identification of a motor vehicle using the method according to the invention and the apparatus from a perspective view from the side.

FIG. 4 and FIG. 5 illustrate by way of example how a motor vehicle is identified in recordings from different perspectives. In the example according to FIG. 4, the recorded image 20 was recorded with an image-capture device BE arranged above the road 12. In the example illustrated in FIG. 5, the image 20 has been recorded with an image-capture device BE which is arranged laterally with respect to the road 12.

Within the perspectively distorted image 20 of the motor vehicle 13, the license-plate position and the outline of the license plate 15 are recognized by ascertaining at least the four corner points of the license plate 15, and a license-plate contour 21 is produced in correspondence with the outline. The four corner points define, depending on the arrangement of the image-capture unit BE, a varyingly shaped, oblique-angled square. For the basic function of the method, no evaluation (OCR) of the license plate content is necessary.

The actual license-plate size can be ascertained from the knowledge relating to the dimensions of license plates and can optionally be supplemented by the additional evaluation of known dimensions of the character size of the license-plate lettering. On the basis of this additional information, the license-plate format in image 20 is determined.

After the license-plate format is associated, a calculation rule for perspectively rectifying the license-plate contour 21 and thus the front view 14 is established on the basis of a comparison of the ascertained license-plate format and the perspective of the license-plate contour 21 present in the image 20.

After the license-plate format is ascertained, an image region (outline of the entire vehicle front, of the vehicle rear or of a characteristic detail thereof, preferably in the form of a rectangle 22) is established, which image region is related to the size and position of the license-plate contour 21, is enlarged in a defined ratio and in a specific position with respect to the license-plate contour 21 and is perspectively distorted in the same manner. The extent of the perspectively distorted rectangle 22 is chosen such that the essential part of the front view 14 (containing at least radiator and headlights) is captured in this image detail. The image content of the perspectively recorded image 20 that is located outside the (perspectively distorted) rectangle 22 is discarded and only the image content situated within, having the image of the front view 14 (or part thereof), is used for the further image evaluation.

In order to procure comparison possibilities, the front view 14 is parameterized. Parameterization means in this case that the positions and sizes of characteristic features in the front view 14 are captured. To this end, search methods for edge extraction, for example by producing an edge or outline image using Sobel filters, are used to capture contours 24 within the rectangle 22 of the extracted front view 14 of the motor vehicle 13 as characteristic features. Said contours 24 can, for example, be derived from outlines or structures of constructive elements of the front view 14, such as headlights, venting-air inlets, bumpers, body covers or body edges etc. The production of such an edge image has the advantage that color variations and brightness variations have no significant influence on the image evaluation.

On the basis of the already ascertained calculation rule, the rectangle 22 is perspectively rectified using the edge image reduced to the contours 24, is scaled to the standardized size ascertained in the comparison of the license-plate formats, and a rectified and parameterized front view 23 of the rectangle 22 is produced.

After the perspective rectification and scaling to the reference images 30 stored in the database DB, a front view 23 which is directly comparable to the reference images 30 is then produced. The reference images 30 of the database DB all have a standardized scaling in terms of size and format of the license-plate contour 21 and contain a stylized front view 14 with characteristic features in the form of contours 24 without perspective distortions.

The database DB contains such a number of typical reference images 30 as is sufficient for being able to identify a motor-vehicle class. As illustrated in FIG. 4 and FIG. 5, these can be image recordings with characteristic features of specific vehicle classes which are categorized for example into a reference-image class 31 for small cars, a reference-image class 32 for medium-sized vehicles, a reference-image class 33 for pickup trucks and a reference-image class 34 for trucks. From the reference-image classes 31 to 34, the image with the greatest correspondence to the recorded image is ascertained. In the example in FIG. 4, the greatest correspondence is to the reference image 34 from the class of the trucks. In the example in FIG. 5, the greatest correspondence is to the reference image 32 from the class of the medium-sized cars. Thus the class of the recorded motor vehicle is ascertained and the sort of motor vehicle is uniquely identified. The ascertained motor-vehicle class is output as the result of the method.

Figure 6:
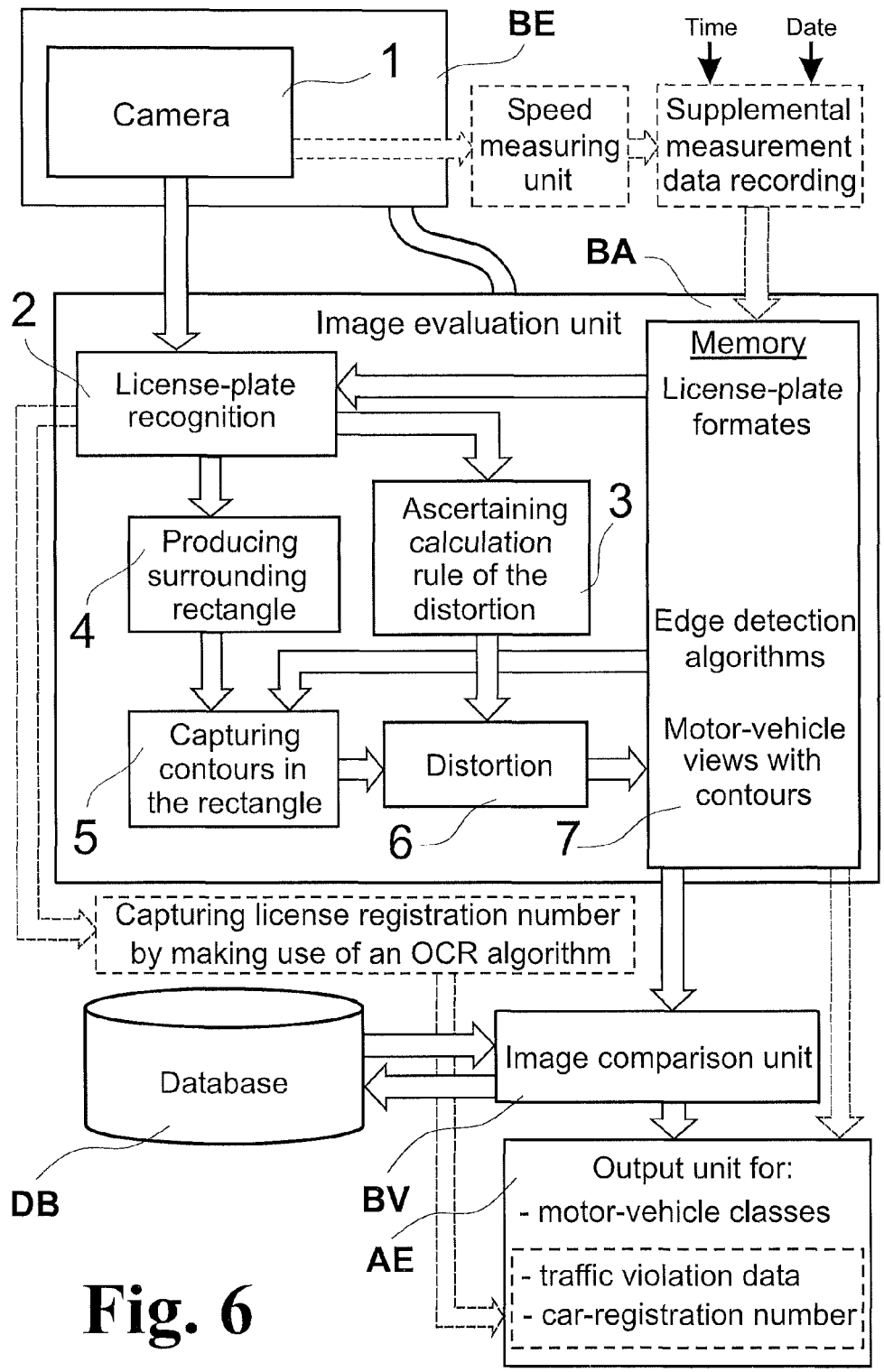
FIG. 6 shows a block diagram of the apparatus according to the invention.

FIG. 6 illustrates the construction of the apparatus according to the invention using a block diagram. The apparatus comprises the functional units image-capture device BE having a camera 1, image-evaluation unit BA, image comparison unit BV, a database DB with reference images 30, and an output unit AE.

Images are recorded using the camera 1. In an advantageous construction, the image-capture device BE represents a separate unit connected to the apparatus by a flexible cable.

In the image-evaluation unit BA, capture and evaluation of the features of the recorded image 20 take place. For this purpose, six specialized modules are provided.

In a recognition module 2, first the localization of the license plate in the motor-vehicle view of the motor vehicle takes place. Owing to the recognition of at least the four corner points of the license plate, a license-plate contour 21 is produced which corresponds to the imaged, perspectively distorted license-plate outline.

The actual license-plate format can be ascertained from the knowledge relating to the standardized dimensions of license plates 15 and can optionally be supplemented by the additional evaluation of standardized dimensions of the character size of the license-plate lettering. With this information, it is possible in a calculation module 3 to ascertain the format of the recorded license plate 15 on the basis of a comparison with the standardized license-plate formats stored in the memory 7 of the image-evaluation unit BA and, from the form deviations, to derive a calculation rule for the rectification of the image with respect to the perspectively recorded front view 14. Alternatively, the same principle can also be applied to the vehicle rear in the same manner.

In dependence on the ascertained license-plate format, in a selection module 4, a rectangle 22 is placed around the license-plate contour 21, and this rectangle is extended to a prescribed position and magnification with respect to the license-plate contour 21. In order to reduce the amount of data to be processed, the image content within the rectangle 22 is extracted and the remaining image content is discarded. Afterwards, the extracted image detail (rectangle 22) is adapted to the stored format of the reference images 30 in the database DB by scaling the image size.

In a filter module 5, characteristic features of the recorded motor vehicle 13 are ascertained. The recognition takes place through application of typical image processing methods for edge extraction, for example using a Sobel filter, with which the contours 24 are singled out from the rectangle 22 of the motor-vehicle front on the basis of brightness differences or contrast differences including the gradients derived therefrom. The result is a front view 23 reduced to the contours 24.

In addition, the image-evaluation unit BA has a geometry module 6, in which the rectangle 22 is perspectively rectified using the calculation rule produced in the calculation module 3. The front view 23, which is now directly comparable to the reference images 30 in the database DB, is stored in the memory 7 of the image-evaluation unit BA and transferred to the image comparison unit BV.

In the image comparison unit BV, the processed image (rectified and parameterized front view 23 with contours 24) is checked against the reference images 30 of the database DB for similarity. The database DB contains such a number of typical reference images 30 as is sufficient to be able to identify a motor-vehicle class. In addition, it is also possible to store reference images 30, which have already been processed using edge-extraction methods and classified, in the database DB. The reference image 30 with the greatest correspondence is ascertained and the motor-vehicle class associated with this reference image is assigned as a result of the identification of the recorded motor vehicle. The result can be read at the output unit AE of the apparatus.

The reference-image classes 31-34, which are associated with the reference images 30, can, however, also be modified in various ways. In one modified variant of the method, the motor vehicles can also be categorized, on the basis of the comparison of characteristic features and contours 24, according to vehicle manufacturers.

In one further variant, the method is used for traffic counting. This can take place in the form of a mobile unit which is positioned next to a road without much outlay in terms of placement and mounting of the apparatus. It is possible owing to the identification of the motor-vehicle class to ascertain the composition of the monitored traffic. It is then possible, for example, to carry out statistical evaluations on the basis of the number of the captured small cars, medium-sized cars, luxury cars, pickup trucks, trucks etc.

In the case of the use of the method for traffic violation prosecution, for example in connection with a speed measurement, it is sensible to also capture the registration number of the motor vehicle 13 illustrated on the license plate for identification purposes. For this purpose a speed measurement system 8 to measure the speed of a vehicle is coupled with the camera 1 to associate the speed measured to the vehicle imaged and captured by the camera 1. To this end, the method can be extended by an additional method step with which recognition using an OCR method of the license plate 15 can be realized by making use of an OCR algorithm provided in the image evaluation unit BA.

LIST OF REFERENCE SIGNS

BE image-capture device
BA image-evaluation unit
BV image comparison unit
DB database with reference images
AE output unit
α, β angle of the image-capture device with respect to the road
1 camera
11 image region of the image-capture device
12 road
13 motor vehicle
14 front view (motor-vehicle view, containing license plate)
15 license plate 2 recognition module
3 calculation module
4 selection module
5 filter module
6 geometry module
7 memory
20 recorded image
21 license-plate contour
22 rectangle (image region)
23 front view (rectified and parameterized)
24 contour
30 reference images
31 reference-image class for small cars
32 reference-image class for medium-sized cars
33 reference-image class for pickup trucks
34 reference-image class for trucks While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

The invention claimed is:

1. A method for identifying motor vehicles for monitoring traffic, comprising the following steps:
   a) recording a perspective image of a motor vehicle under an acute angle with respect to the road, wherein the recorded image contains at least a motor-vehicle view that has a license plate,
   b) recognizing the license plate in the recorded image and capturing a license-plate contour,
   c) ascertaining the format of the license-plate contour from the comparison of the corner points of the license-plate contour with stored standardized license-plate formats from a memory,
   d) ascertaining a calculation rule for perspective rectification of the license-plate contour on the basis of the associated standardized license-plate format,
   e) producing an image region which is perspectively distorted in a matching manner with respect to the license-plate contour, with a prespecified magnification in dependence on the ascertained format of the license-plate contour,
   f) extracting the content of the distorted image region surrounding the license-plate contour, and discarding the remaining recorded image of the motor vehicle,
   g) adapting a license-plate-containing motor-vehicle view, which is extracted from the distorted surrounding image region, to the format of reference images stored in a database,
   h) rectifying the motor-vehicle view using the calculation rule ascertained from the license-plate contour,
   i) comparing similarities of the captured contours and their position with those of reference images from the database, and recognizing the greatest correspondence of the captured contours with one of the reference images, and
   j) categorizing the recorded motor vehicle into a reference-image class, with which the reference image with the greatest correspondence was associated, and outputting a motor-vehicle class derived from the reference-image class.

2. The method as claimed in claim 1, wherein, in the production of the surrounding image region, its size ratio and position with respect to the license-plate contour are derived from the ascertained standardized license-plate format.

3. The method as claimed in claim 1, wherein, after extracting the surrounding distorted image region, characteristic features in the form of contours within the extracted license-plate-containing motor-vehicle view are captured.

4. The method as claimed in claim 1, wherein a correlation method is used for the similarity comparison of the captured contours with the stored reference images.

5. The method as claimed in claim 1, wherein the positions, distances and size ratios of the contours with respect to license-plate contour are compared for the similarity comparison of the captured contours with the stored reference images.

6. The method as claimed in claim 1, wherein the image recording takes place under a lateral angle with respect to the road and the motor vehicle is recorded in a perspective view.

7. The method as claimed in claim 1, wherein the image recording takes place under an elevation angle with respect to the road and the motor vehicle is recorded in a perspective view.

8. The method as claimed in claim 6, wherein the angle between the road and the image-capture device is selected to be at most so great that the license-plate-containing motor-vehicle view still has a sufficiently large area of the license-plate contour to allow a unique association of the standardized license-plate formats and thus the perspective rectification is independent from the knowledge of the angle of the image recording with respect to the road of the motor vehicle.

9. The method as claimed in claim 7, wherein the angle between the road and the image-capture device is selected to be at most so great that the license-plate-containing motor-vehicle view still has a sufficiently large area of the license-plate contour to allow a unique association of the standardized license-plate formats and thus the perspective rectification is independent from the knowledge of the angle of the image recording with respect to the road of the motor vehicle.

10. The method as claimed in claim 1, wherein, in addition to the license-plate contour, the position and size of the lettering of the license plate are captured for the ascertainment of the standardized license-plate format.

11. The method as claimed in claim 1, wherein, in addition to the license-plate contour, the registration number of the recorded license plate is captured, subjected to an OCR method and stored for the prosecution of a traffic violation.

12. The method as claimed in claim 11, wherein, in addition to the image recording, still further measurement data in connection with a traffic violation, date and time are simultaneously captured and stored with reference to the recorded image of the motor vehicle by saving this data in a script line directly in the image or in a data container within the image file.

13. An apparatus for identifying motor vehicles for monitoring traffic, comprising
   an image-capture device being aligned for recording an image of the motor vehicle with at least one motor-vehicle view, which contains a license plate,
   a database with reference images,
   a computer based image-evaluation unit with memory containing,
      computer software configured to recognize said license plate, computer software configured to separate image background and to extract a relevant motor-vehicle view from the recorded image, computer software configured to capture characteristic features within the extracted motor-vehicle view, computer software configured to determine the size ratios of a license-plate contour in the perspectively distorted image on the basis of stored standardized license-plate formats, computer software configured to determine the size of the perspective distortion of the license-plate contour on the basis of the associated standardized license-plate format, computer software configured to establish a calculation rule for the perspective rectification on the basis of the ascertained distortion of the license-plate contour with respect to the associated license-plate format, and computer software configured to rectify the extracted license-plate-containing motor-vehicle view, wherein the calculation rule for rectification of the license-plate contour is intended for the rectification of the entire extracted license-plate-containing motor-vehicle view such that the perspective rectification is achieved from the exact knowledge of the angle of the image recording with respect to the road of the motor vehicle;

an image comparison unit having computer software configured to compare characteristic features of the extracted motor-vehicle view with those of reference images from a database, computer software configured to recognize the greatest correspondence of the motor-vehicle view with one of the reference images and computer software configured to associate the ascertained reference image with the greatest correspondence to a motor-vehicle class, and an output unit.

14. The apparatus as claimed in claim 13, wherein the image-evaluation unit has computer software configured to produce a surrounding image region, which is perspectively distorted in a matching manner with respect to the license-plate contour, for extracting the license-plate-containing motor-vehicle view to be evaluated from the recorded image, wherein said computer software configured to produce the surrounding image region contain an adjustment of the size of the image region with respect to the license-plate contour in dependence on the standardized license-plate format associated with the license-plate contour.

15. The apparatus as claimed in claim 14, wherein the image-evaluation unit has computer software configured to determine characteristic features in the form of contours within the produced surrounding image region, and the result from the computer software configured to determine the contours is supplied to the computer software configured to rectify the extracted license-plate-containing motor-vehicle view.

16. The apparatus as claimed in claim 13, wherein the apparatus additionally has a measurement system for determining the speed of the motor vehicle and computer software configured to recognize the registration number within the license-plate contour.

* * * * *